Oct. 30, 1934.     A. Y. DODGE     1,978,699
BRAKE
Original Filed Oct. 30, 1926

INVENTOR.
ADIEL Y. DODGE
BY A. R. McCrady
ATTORNEY.

Patented Oct. 30, 1934

1,978,699

UNITED STATES PATENT OFFICE

1,978,699
BRAKE

Adiel Y. Dodge, South Bend, Ind., assignor to Bendix Aviation Corporation, South Bend, Ind., a corporation of Delaware Original application October 30, 1926, Serial No. 145,189. Divided and this application November 23, 1931, Serial No. 576,914

15 Claims. (Cl. 188—79.5)

This invention relates to brakes and is illustrated as embodied in an internal expanding brake for an automobile. An object of the invention is to improve the general organization of a brake of this character, especially with respect to the positioning and anchoring of the shoes and the manner in which one shoe may be arranged to apply a different shoe.

One feature of novelty relates to arranging a pair of unconnected shoes in such a manner that they have direct thrust engagement with each other so that one shoe applies the other. Preferably the engaging ends of the shoes are formed with rounded thrust surfaces which may take the form of flanges extending integrally from stampings from which the shoes are built up.

Another feature of the invention has to do with positioning the shoes when the brake is released by providing a novel automatically-adjusted stop which is preferably secured to and carried by the shoe itself. In one desirable arrangement the stop is arranged to engage and be operated by a novel steady rest,—that is, a device arranged to resist lateral movement of the shoe.

Another feature of the invention relates to providing one end of the retarding device, that is, one end of one of the shoes in the illustrated form, with a separate anchor device, while the opposite end is arranged to anchor when the drum is turning in the opposite direction against a part of the brake-applying means, for example on a bracket carrying the brake-applying shaft and having a novel mounting shown as including fastenings seated against the ends of slots in the backing plate of the brake to transmit the braking torque to the backing plate.

The above and other objects and features of the invention, including various novel combinations of parts and desirable particular constructions, will be apparent from the following description of one illustrative embodiment shown in the accompanying drawing, in which.

Figures 1, 2, 3, 4, 5:
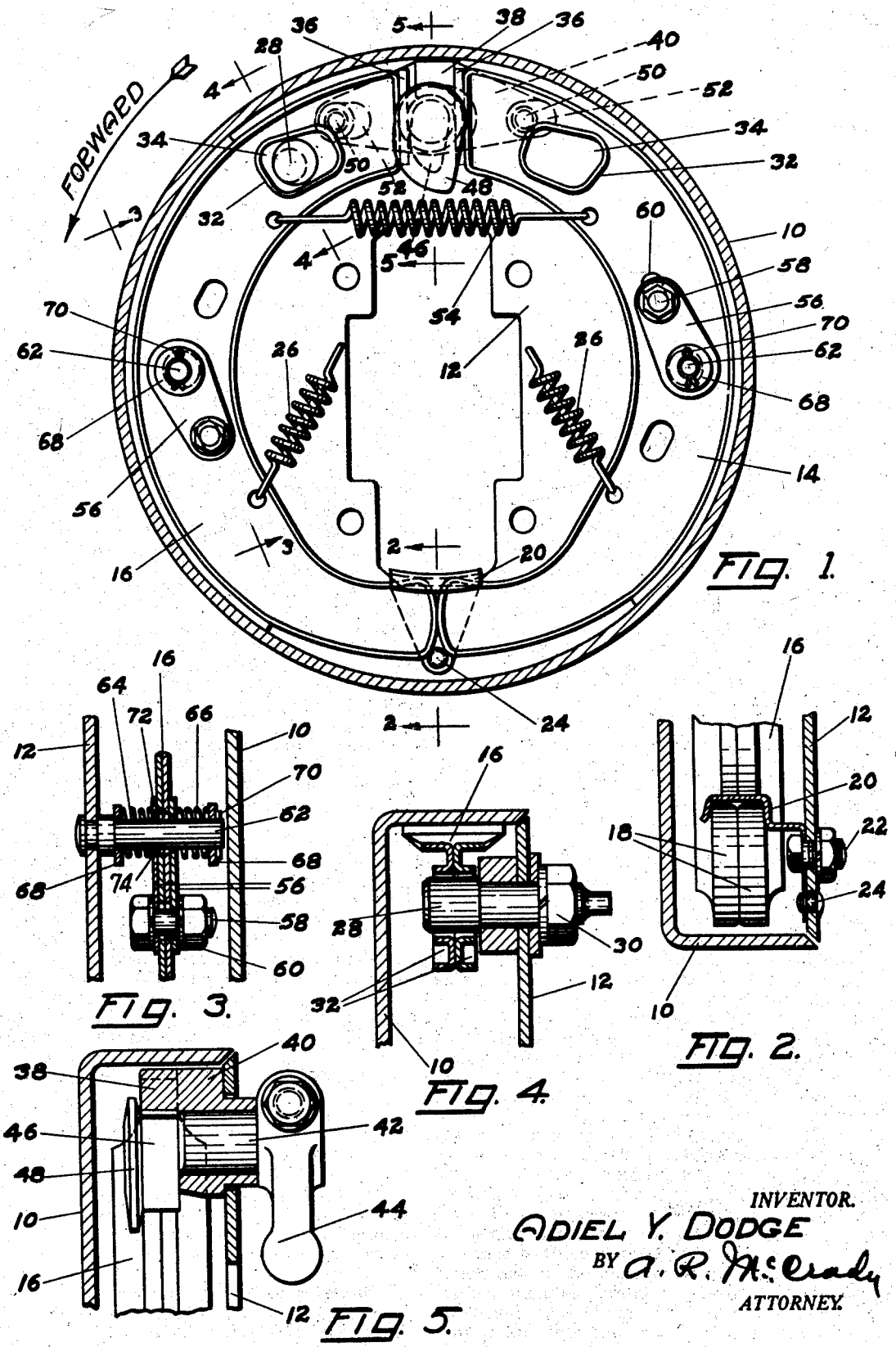
Figure 1 is a vertical section through the brake just inside the head of the brake drum and showing the brake shoes in side elevation.
Figure 2 is a partial radial section through the brake on the line 2—2 of Figure 1, showing one of the shoes in end elevation.
Figure 3 is a partial section on the line 3—3 of Figure 1, showing the automatic adjustment.
Figure 4 is a partial radial section through the brake on the line 4—4 of Figure 1 showing the separate anchor.
Figure 5 is a partial radial section on the line 5—5 showing the brake-applying means.

The illustrated brake includes a rotatable drum 10, at the open side of which there may be arranged a suitable backing plate 12 and within which is arranged the retarding means of the brake, which in this particular embodiment takes the form of a pair of arcuate and substantially rigid shoes 14 and 16 which are preferably interchangeable. In the arrangement illustrated, each of the shoes 14 and 16 is built up of a pair of stampings of general channel form which are riveted or spot-welded or otherwise secured together back to back.

The above-described brake shoes are arranged to form a brake of the "duo servo" type, —that is, the shoe 16 applies the shoe 14 when the drum is turning in a counter-clockwise direction, while the shoe 14 applies the shoe 16 when the drum is turning in a clockwise direction. The shoes are not, however, connected in any way but are rounded at their lower ends to form thrust surfaces in direct engagement with each other, these surfaces being shown as formed by flanges 18 extending across the ends of the channel-shaped stampings making up the shoes. The shoes are kept in alinement with each other by a guide member such as a stamping 20 secured to the backing plate 12 by a bolt 22 and held from turning by a stud 24. The guide 20 has a part engaging the adjacent ends of shoes 14 and 16 on their opposite sides to hold them in end-to-end alinement and also has a part extending across these ends and engaged by the ends to position them radially of the drum. The shoes are urged inwardly away from the drum and upwardly against the guide 20 at their lower ends by suitable springs 26 connected at their lower ends to the shoes and at their upper ends to the backing plate 12.

When the drum is turning in a clockwise direction (that is, in the opposite direction from that shown in Figure 1) shoe 16 anchors against a separate eccentric adjustable stop or anchor 28 secured to the backing plate 12 by a nut 30 and engaged by thrust flanges 32 drawn outwardly in opposite directions from the two stampings making up the shoe about an opening 34 through which the anchor passes. The stop or anchor 28 is illustrated as passing through washers or spacers on opposite sides of the backing plate. When the drum is turning in a counterclockwise direction, as illustrated in Figure 1, the torque of the brake is taken by direct engagement of the wear plate 36 at the end of shoe 14 with an anchor projection or stop 38 formed on a bracket 40 in which is journalled at its center a shaft 42 operated by a lever 44 and carrying a cam 46 engaging the wear plate 36 of shoe 16 and provided with an end flange 48 positioning laterally the upper ends of the shoes 14 and 16. The bracket 40 is held by a pair of fastenings such as bolts 50 passing through elongated slots 52 in the backing plate. Fastenings 50 are free to shift in the openings 52 but are normally at the left of the elongated slots 52 so that in the counterclockwise direction of drum rotation the braking torque is transmitted to the backing plate 12 through the engagement of the bolts 50 with the left-hand ends of the slots 52. A suitable return spring 54 is provided to resist the brake-applying movement of the shoes when the cam 46 is operated.

Each of the shoes is preferably provided with an automatically-adjusted stop including a pair of members 56 lying flat against the opposite sides of the web of the shoe and frictionally clamped at their ends to the shoe by a bolt 58 passing through a slot 60. Passing through the other end of each of the pair of members 56 is a device 62 in the form of a steady rest pin carried by the backing plate 12 to which it is riveted or otherwise secured at its end, and on which there are sleeved two compressed coil springs 64 and 66 arranged on opposite sides of the shoe and confined between the members 56 and washers 68 carried by the steady rest pin 62, the outermost washer 68 being held by a cotter pin 70. It will be seen that the pin 62 and the two springs 64 and 68 constitute a steady rest yieldingly resisting lateral movement of the shoe.

Each pin 62 passes through a relatively large opening 72 in its shoe, so that the pin does not directly engage the shoe at any time. The pin also passes through openings in members 56 which are slightly larger in the direction of brake-applying movement of the shoe than the diameter of the pin 62, by an amount equal to the desired brake-releasing movement of the shoe,—that is, the clearance of the openings in members 56 with respect to pin 62 determines the clearance of the shoe with respect to the drum when the brake is released. Cam 46 is turned by any suitable adjustment, preferably acting automatically, so that the lower ends of shoes 14 and 16 remains in engagement with each other when the brake is released.

When the brake is applied, the shoe moves with its adjusting members 56 until the openings in the adjusting members engage the pin 62, at which time normally the brake will be applied. In case, however, there has been any considerable wear of the brake lining, the shoe will continue to move slightly until it is fully applied, whereas the members 56 will be prevented from further movement by pin 62 and thus will be shifted with respect to the shoe against the frictional resistance of the attaching means including bolt 58, this shifting being permitted by the slot 60. Now when the brake is again released, the shoe will move away from the drum only so far as to give the desired predetermined clearance, after which the adjusting members 56 will again engage the pin 62 to hold the shoe in its new or adjusted idle position.

This application is a division of my copending application, Serial No. 145,189, filed October 30, 1926.

While one illustrative embodiment has been described in detail, it is not my intention to limit the scope of the invention to this particular embodiment or otherwise than by the terms of the appended claims.

I claim:

1. A brake comprising, in combination, a rotatable drum, a non-rotatable retarding device engageable with the drum, an adjusting member carried by the retarding device and movable with respect to the retarding device upon the application of considerable force, and a stationary stop engaged by the adjusting member after predetermined movement of the retarding device when the brake is applied, in such a manner as to shift the adjusting member in case of continued movement of the retarding device, the stop also being engaged by the adjusting member when the brake is released, in such a manner as to determine the idle position of the retarding member.

2. A brake comprising, in combination, a rotatable drum, a non-rotatable retarding device engageable with the drum, an adjusting member frictionally clamped to the retarding device, and a stop passing through an opening in the adjusting member and engaged by the adjusting member after predetermined movement of the retarding device when the brake is applied, in such a manner as to shift the adjusting member in case of continued movement of the retarding device, the stop also being engaged by the adjusting member when the brake is released, in such a manner as to determine the idle position of the retarding member.

3. A brake comprising, in combination, a shoe having a stiffening web formed with an opening, an adjusting member lying against said web and formed with an opening at each end, one of which is alined with said opening in the web, a fastening passing through the alined openings and clamping the adjusting member to the web in a manner permitting it to shift on the application of considerable force, and a stop passing through the opening at the opposite end of the adjusting member and smaller than said opening in the direction of brake-applying movement of said opening by an amount predetermining the movement of the shoe in releasing the brake.

4. A brake comprising, in combination, a shoe having a stiffening web, an adjusting member lying against said web and frictionally gripped at one end to said web and formed with an opening at its opposite end, and a stop passing through the opening in the adjusting member and smaller than said opening in the direction of brake-applying movement of said opening by an amount predetermining the movement of the shoe in releasing the brake.

5. A brake comprising, in combination, a retarding member, an adjusting member lying flat against the retarding member and frictionally gripped thereto at one end, and a stop engaged by the adjusting member after predetermined movement of the retarding member in either a brake-applying direction or a brake-releasing direction.

6. A brake comprising, in combination, a retarding member, an adjusting member frictionally gripped to the retarding member, and a stop engaged by the adjusting member after predetermined movement of the retarding member in either a brake-applying direction or a brake-releasing direction.

7. A brake comprising, in combination, a retarding member, a pair of adjusting members frictionally gripped to opposite sides of the retarding member, and a stop engaged by both adjusting members after predetermined movement of the retarding member in either a brake-applying direction or a brake-releasing direction.

8. A brake comprising, in combination, a retarding member, a pair of adjusting members frictionally gripped to opposite sides of the retarding member, a stop engaged by both adjusting members after predetermined movement of the retarding member in either a brake-applying direction or a brake-releasing direction, and a pair of springs carried by the stop and engaging the two adjusting members and yieldingly resisting lateral movement of the retarding member.

9. A brake comprising, in combination, a retarding member having an opening, a stop passing through said opening, springs on the stop on opposite sides of the retarding member and yieldingly resisting lateral movement of the retarding member, and an adjusting member engaging said stop after a predetermined brake-applying or brake-releasing movement of the retarding member and held by the stop against movement in case of brake-applying movement of the retarding member in excess of said predetermined movement.

10. A brake comprising, in combination, a retarding member having an opening, a stop passing through said opening, means associated with the stop and resisting lateral movement of the retarding member, and an adjusting member engaging said stop after a predetermined brake-applying or brake-releasing movement of the retarding member and held by the stop against movement in case of brake-applying movement of the retarding member in excess of said predetermined movement.

11. A brake comprising, in combination, a retarding member having an opening, a stop passing through said opening, means associated with the stop and resisting lateral movement of the retarding member, and an adjusting member engaging said stop after a predetermined brake-applying or brake-releasing movement of the retarding member.

12. A brake comprising, in combination, a retarding member, a steady rest resisting lateral movement of the retarding member, and an adjusting member engaging a part of the steady rest after a predetermined brake-applying or brake-releasing movement of the retarding member and held by said part of the steady rest against further movement in case of brake-applying movement of the retarding member in excess of said predetermined movement.

13. A brake comprising, in combination, a retarding member having an opening, and a steady rest resisting lateral movement of the retarding member and including a part passing through said opening and also arranged to serve as a stop predetermining the idle position of the retarding member.

14. A brake comprising, in combination, a retarding member, and a steady rest resisting lateral movement of the retarding member and including a part arranged to serve as a stop predetermining the idle position of the retarding member.

15. A brake shoe, and an automatically-adjusted positioning device carried by the shoe and clamped frictionally to the shoe.

ADIEL Y. DODGE.